Z. LITTMAN.
VALVE.
APPLICATION FILED AUG. 8, 1919.
1,419,678.
Patented June 13, 1922.
2 SHEETS—SHEET 2.
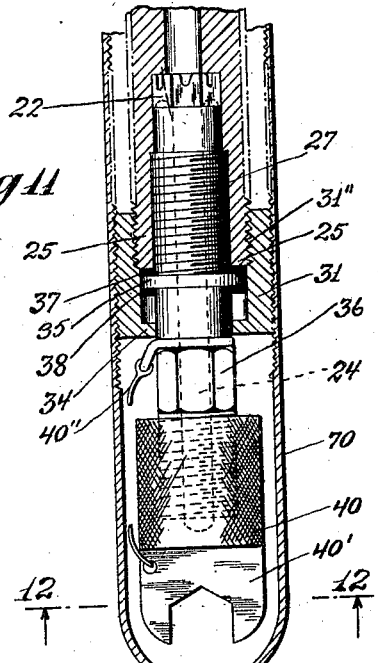
Fig 11
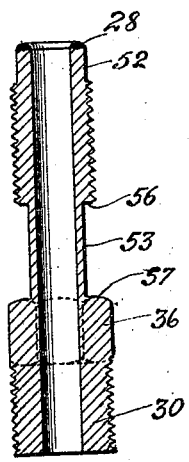
Fig 16
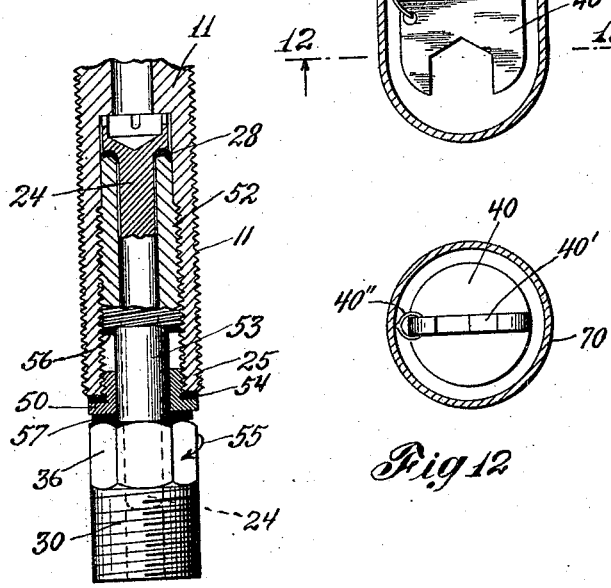
Fig 13
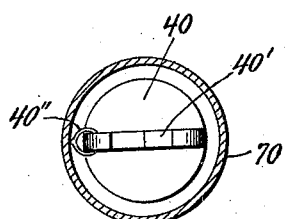
Fig 12
Fig 14
Fig 15
INVENTOR
Zeno Littman
BY
Frank J. Hunt
ATTORNEY

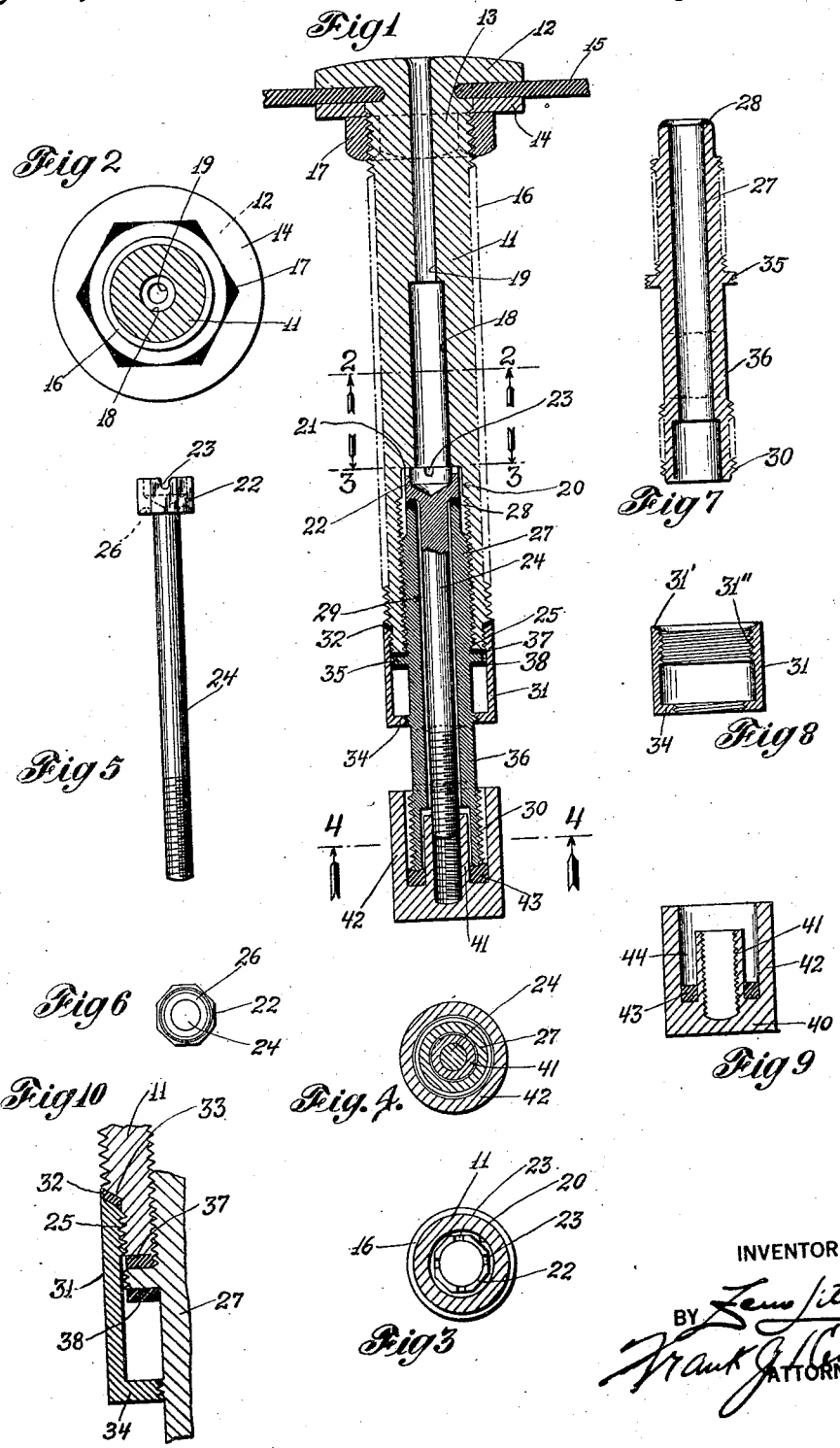

UNITED STATES PATENT OFFICE.

ZENO LITTMAN, OF NEW YORK, N. Y., ASSIGNOR TO LITTMAN LOXAIR VALVE CORPORATION, A CORPORATION OF DELAWARE.

VALVE.

1,419,678. Specification of Letters Patent. Patented June 13, 1922.

Application filed August 8, 1919. Serial No. 316,064.

*To all whom it may concern:*

Be it known that I, ZENO LITTMAN, a citizen of the United States, residing at New York, in the county of New York and State of New York, have invented certain new and useful Improvements in Valves, of which the following is a specification.

This invention relates to air-valves, being particularly valuable in air-valves for use on pneumatic tires for automobiles.

The principal objects of the invention are to provide springless valve structure including a valve member and positive means for forcing the valve-member into co-action with its seat when the tire is inflated to the desired extent, and at the same time a structure so designed that the valve-member not thus positively set, the valve-member is moved away from its valve-seat or toward its valve-seat according as there is an overbalancing air-pressure at the outer or inner end of the valve structure. By the inner and outer ends of the valve structure are meant, respectively, the end of the structure adjacent to the tire and the end of the structure most removed from the tire; the terms "inner" and "outer" being employed in a similar sense in referring to other elements and to parts and surfaces of such elements.

In order to facilitate the attainment of these ends, the valve structure preferably includes the combination of a valve casing having a bore near its inner end and a bore of larger diameter near its outer end, to provide an annular shoulder intermediate the ends of the casing constituting a stop; a valve member movable in the larger bore toward and away from such stop and so shaped as always to permit air communication between the two bores; an annular valve-seat member carrying at its inner end a valve seat for co-action with the outer end of the valve member, and threadedly adjustable in the larger bore of the casing to positively force the valve member and its valve seat into co-action; a stop ring threaded on the outer end of the casing for limiting the outward adjustment of the annular valve-seat member when the valve member is to be permitted to function as a balancing valve member; and a valve cap including two spaced annular walls, the inner wall for threaded adjustment on the outer end of a valve stem extending outwardly through the annular valve-seat member from the outer end of the valve member, and the outer wall for housing within it the outer end of the annular valve-seat member; certain of these parts being so arranged and equipped with gaskets as to insure that leakage between various of the parts is minimized in all adjustments of the valve.

The invention will be more clearly understood from the following description, when taken in connection with the accompanying drawing. This drawing shows what is merely an illustrative embodiment of the invention, to wit, that embodiment including structural features at present deemed advantageous and referred to immediately above; it of course being understood that the scope of the invention is to be taken from the appended claims.

In the accompanying drawing, Figure 1 is an axial section, showing the complete valve, with the same locked against air passage in either direction and further sealed by the valve cap, in other words, with the valve parts disposed as they would be during rolling of the tire over the road; Figures 2, 3 and 4 are transverse sections, taken respectively on lines 2—2, 3—3 and 4—4 of Figure 1; Figure 5 is a side elevation of the balancing valve member; and Figure 6 is a bottom plan view thereof; Figure 7 is an axial section of the valve-seat member; Figure 8 is an axial section of the stop ring for the valve-seat member; Figure 9 is an axial section of the valve cap; Figure 10 is an enlarged detail view of certain of the parts shown in Figure 1, showing fragments of the valve casing, the valve-seat member and the clamp ring. Figure 11 is a sectional view of a slightly modified form of construction; Figure 12 is an end view of the valve as taken on substantially the plane of line 12—12 of Figure 11; Figure 13 is a sectional view of another form of the valve; Figures 14 and 15 are sectional and plan views respectively of one of the members of this form of valve and Figure 16 is a longitudinal sectional view of the sleeve member of this form of valve.

Similar reference characters refer to similar parts throughout the several views of the drawings.

Referring to Figures 1 and 2, 11 represents a valve casing, including an enlarged head 12 and a smooth shank base 13. A washer 14 is loose on the shank base, the head and the washer for clamping a part 15 of the tire-tube between them when the valve structure is mounted in the tire. The exterior of the casing 11 is threaded at 16, to permit a nut 17 to be screwed up on the casing to join the washer 14 tight against the tube part 15.

Referring to Figure 1, the casing 11 has a bore 18—19 at its inner end, and a bore 20 of larger diameter at its outer end, to provide an annular shoulder 21 intermediate the ends of the casing constituting a stop.

Referring to Figures 1, 3, 5 and 6, a valve member 22 is seated in the larger bore 20, and in one adjustment of the parts, that shown in Figure 1, has its inner end forced in against the stop-shoulder 21. Even in this position of the valve member 22, however, air may freely pass back and forth between the two bores 18 and 20. This is so because the upper end of the valve member is cupped as shown, the rim of the cup is slotted at various points 23 (see particularly Figure 3), and the valve member is polygonal in cross section and loosely housed in the bore 20.

The valve member 22 carries a stem 24, extending outwardly from the center of the outer end of the valve member. This stem projects well beyond the outer reduced end 25 of the casing.

On the rear end of the valve stem, is formed around the base of the valve stem, is formed an annular groove marked 26 in Figures 5 and 6. This groove is the part of the valve member for directly co-acting with the valve seat on the inner end of an annular valve-seat member 27 loosely sleeving the valve stem 24. Such valve seat is marked 28 in Figure 7 to which attention is also now directed. As indicated, the valve-seat member 27 is threadedly adjustable in the casing 11, to move the valve seat away from the valve member, to permit play of the latter back and forth in the bore 20, or to move the valve seat toward the stop shoulder 21 to force the parts together as shown in Figure 1. The valve seat 28 being preferably formed of packing material, that is, constituted as a gasket, it is clear that with the parts arranged as illustrated, no air can pass from the bore 20 to the annular passage 29 between the valve-seat member 27 and the valve-stem 24. On the other hand, when the valve-seat member is turned to draw the valve seat away from the valve member, either deliberately, as to increase the degree of inflation of the tire, or accidentally, as from road vibrations, the valve member becomes an automatic balancing valve, so functioning that if the pressure within the tire is greater than atmospheric, the valve member is forced securely into co-action with the valve seat, but if air under greater pressure than that inside the tire is admitted to the passage 29, the valve member leaves the valve seat and permits increased inflation of the tire.

In order to permit air under pressure to be admitted to the passage 29, when it is desired to inflate the tire, the outer end of the valve-seat member 27 has external threads at 30, so that such member may be connected in the familiar manner with a suitable air-pressure line.

The outer reduced end portion 25 of the casing 11 is externally threaded as indicated, so that a stop ring 31 may be screwed in place on the outer end of the casing as shown in Figures 1 and 10. This stop ring is also shown, removed, in Figure 8. The stop ring has its inner edge 31' beveled, and above the beveled portion the interior wall portion 31'' is threaded, as shown most clearly in Figure 8; and as shown most clearly in Figure 10, a gasket 32 may be interposed between such beveled edge of the stop ring 31 and a shoulder 33 on the casing 11. This stop ring serves to limit the outward movement of valve-seat member 27 when the latter is turned to withdraw the valve-seat from the valve member 22; for it will be seen that stop ring 31 at its outer end is provided with an inwardly directed interiorly threaded flange 34; and that valve-seat member 27 is provided with an external threaded collar 35. The valve-seat member 27 has an accessible part of its length formed of hexagonal cross section as indicated at 36 in Figures 1 and 7, to permit the valve-seat member to be turned to move the valve-seat away from the valve member 22, but such movement will be stopped when collar 35 engages flange 34. As shown most clearly in Figure 10, gaskets 37—38 are sleeved on the valve-seat member on opposite sides of collar 35; with the result that when the parts are disposed as shown in Figure 1, and valve 22 is positively held closed, gasket 37 is clamped between collar 35 and the outer end of casing 11, thus preventing any possible leakage of air between the co-acting threads on valve-seat member 27 and inside casing 11; and when valve-seat member 27 is moved out to the maximum extent permitted, gasket 38 is clamped between collar 35 and flange 34 to prevent the escape between stop ring 31 and valve-seat member 27 of any air which may have leaked down within stop ring 31.

Valve stem 24 is threaded at its outer end, so that there may be screwed in place on the valve stem a valve cap 40 shown also in Figures 4 and 9. This valve cap has an inner annular wall 41 and an outer annular wall 42. The inner wall 41 is internally threaded for co-action with the threaded outer end of the valve stem 24. The outer end of the valve-stem member 27 is rounded, and a gasket 43 is seated in the bottom of the annular well 44 established between the two walls 41 and 42. Thus, when the valve cap is mounted on the outer end of the valve stem as described, the gasket 43 is forced tight against the outer end of the valve-seat member 27. This provides the additional security, if such is needed, against leakage of air from the tire during rolling on the road; since even such small amount of air as may improbably escape past the valve and valve-seat, is trapped within the valve cap by means of the gasket 43 therein. Obviously, also, the valve cap 40, when tightened down, will serve to bring the grooved rear face 26 of the valve into closer engagement with the sealing end portion 28 of the member 27, and complete the seal by means of gasket 37.

In the modified form, shown in Figures 11 and 12, the parts are in general the same, and arranged in the same way as already described, but the outer threaded end of the casing is not provided with the stop shoulder 33, (Figure 10). Instead, the outer threaded surface of the casing is threaded on the same diameter throughout for engagement with the interior threads 31'' of stop-ring 31. The stop-ring is provided with collar 35, as before, but the collar is not threaded. Also, as before, there is a gasket 37 to be compressed between collar 35 and end 25 of the casing, and gasket 38 to be compressed between the collar and the flange 34 of the stop-ring. The closure cap 40 has its outer end formed as a wrench, indicated at 40', Figure 11, for engagement with the hexagonal portion 36. The cap may be secured against accidental loss by means of a chain 40'' connecting the cap to member 27, as shown.

A dust-cap 70 may also be provided, interiorly threaded to engage with exterior threads on the stop-ring 31.

In the form shown in Figures 13, 14, 15 and 16, the tubular valve member 52 has a reduced shank 53, defined by a shoulder 56 at one end and by the hexagonal portion 57 at the other. Instead of the stop-ring, heretofore described, I employ a ring 50 (Figure 15), split into two halves 50'—50'', both exteriorly threaded and having, together, a hexagonal flange. This ring 50 is positioned about the shank 53, and member 52 and the ring 50, then screwed down into the interior of shell 11. A gasket covers the shoulder 56, a gasket 54 is interposed between the hexagonal flange of ring 50 and the end of shell 11, and another gasket lies between the hexagonal flange of the ring 50 and the hexagonal portion 36 of the member 52. In the Figure 13, position of the parts there is a seal at the point 28 and at points 54 and 57. When the tubular member 29 is backed out, the seal at 28 is broken, that at 54 remains, and that at 57 is broken. When member 52 is backed out to the full extent the shoulder 56 and the inner end of ring 50 come together, compressing between them the gasket shown in Figure 13 as overlying shoulder 56.

I claim:

1. In an air valve structure, the combination of a valve casing having a stop, a valve member movable therein toward and away from said stop, the casing and the valve member being so formed and arranged that in all positions of the valve member in the casing an air passage is provided between the valve member and the casing and an annular valve seat member fitting within the casing and carrying a valve seat at its inner end for co-action with the outer end of the valve member, there being an air passage in the casing leading to the inner end of the valve member and an air passage in the annular member leading to the outer end of the valve member, said valve seat member being adjustable toward the stop to drive the valve member against the stop and put the valve member and valve seat into co-action and adjustable away from the stop to permit play of the valve member between the stop and the valve seat.

2. The structure defined in claim 1, wherein the opposite ends of the valve member and the air passages are so formed and arranged that, with the annular member in its last-mentioned adjustment, the valve member is moved inward toward the stop or outward toward the valve seat, according as the air pressure is greater on the outer or inner side of the valve member.

3. The structure defined in claim 1, wherein the interior of the casing and the exterior of the valve-seat member carry co-acting threads to permit such adjustment, the exterior of the casing being also threaded and there being provided a stop ring with internal threads co-acting with said threads on the exterior of the casing; the stop ring carrying an inwardly directed flange beyond the outer end of the casing, the annular member carrying an external collar between the outer end of the casing and said flange, and annular gaskets being sleeved on the annular member on opposite sides of said collar.

4. A casing, a tubular member threaded within the shell and adjustable to two positions therein, means for sealing the space between the tubular member and the shell against the passage of air in both of the two positions before-mentioned, a valve for controlling the passage of air from the interior of the tubular member to the interior of the casing, said valve positively closing communication when the tubular member is in one of its adjusted positions and keeping communication closed until the position of the tubular member is changed, and the valve, in the other position of the tubular member, being actuable to either open or close such communication.

5. The device set forth in claim 4, in which a means for actuating the valve independently of the adjustment of the tubular member extends through the tubular member.

In testimony whereof I affix my signature.

ZENO LITTMAN.